(12) United States Patent
Enomoto

(10) Patent No.: US 8,659,841 B2
(45) Date of Patent: Feb. 25, 2014

(54) SUPERWIDE-ANGLE LENS SYSTEM

(75) Inventor: Takashi Enomoto, Chiba (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 13/570,389

(22) Filed: Aug. 9, 2012

(65) Prior Publication Data

US 2013/0038950 A1  Feb. 14, 2013

(30) Foreign Application Priority Data

Aug. 11, 2011  (JP) .................. 2011-176111

(51) Int. Cl.
*G02B 13/04* (2006.01)
*G02B 9/10* (2006.01)

(52) U.S. Cl.
USPC .......................... 359/753; 359/749

(58) Field of Classification Search
CPC ............. G02B 9/04; G02B 9/10; G02B 9/60; G02B 13/04
USPC ................... 359/749, 752, 753, 793
See application file for complete search history.

(56) References Cited

U.S. PATENT DOCUMENTS

| | | | | |
|---|---|---|---|---|
| 8,254,040 B2* | 8/2012 | Peng et al. | ..... | 359/753 |
| 8,422,143 B2* | 4/2013 | Saori | ..... | 359/682 |
| 8,456,763 B2* | 6/2013 | Hsieh et al. | ..... | 359/753 |
| 8,503,110 B2* | 8/2013 | Oshita | ..... | 359/753 |
| 2005/0174463 A1 | 8/2005 | Ohzawa et al. | | |

FOREIGN PATENT DOCUMENTS

| | | |
|---|---|---|
| JP | 4-68307 | 3/1992 |
| JP | 2003-232998 | 8/2003 |
| JP | 2005-221920 | 8/2005 |

* cited by examiner

*Primary Examiner* — David N Spector
(74) *Attorney, Agent, or Firm* — Greenblum & Bernstein P.L.C.

(57) ABSTRACT

A superwide-angle lens system includes a negative first lens group, an aperture diaphragm, and a positive second lens group. The first lens group includes two negative meniscus lens elements, and a positive lens element. The second lens group includes a cemented lens having negative and positive lens elements; and a positive lens element. The following conditions (1) and (2) are satisfied:

$$-1.45 < f12/f < -1.15 \qquad (1)$$

$$1.4 < SF2 < 2.4 \qquad (2)$$

f12: the combined focal length of the two the negative meniscus lens elements in the first lens group,
f: the focal length of the lens system,
SF2: the shaping factor of the negative meniscus lens element on the image side in the first lens group.

5 Claims, 3 Drawing Sheets

FIG.1
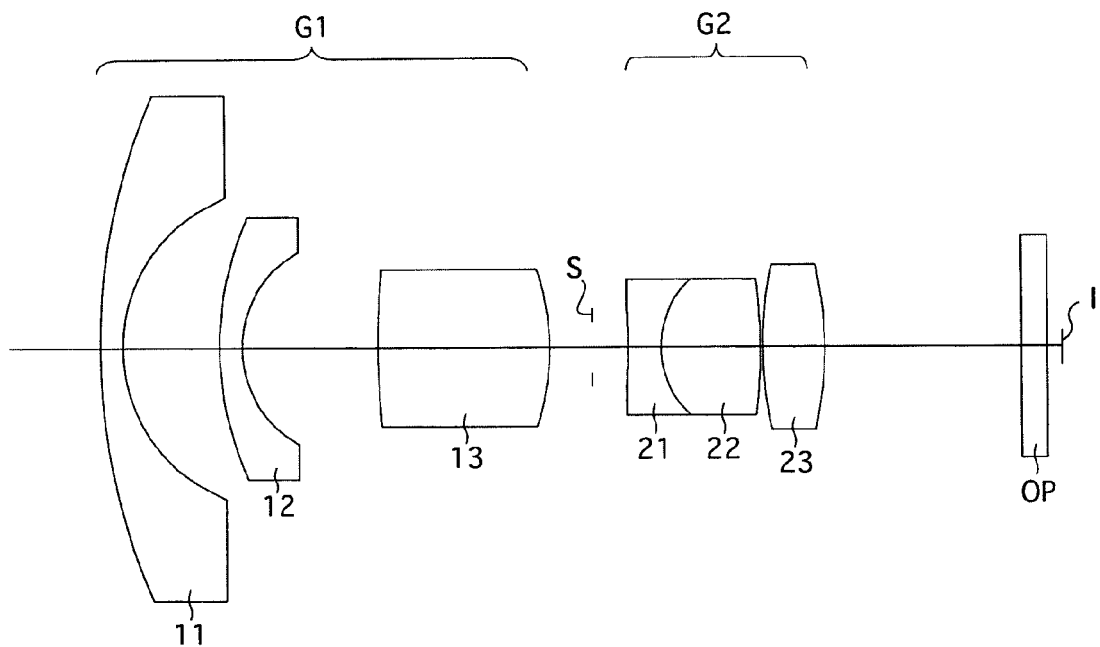
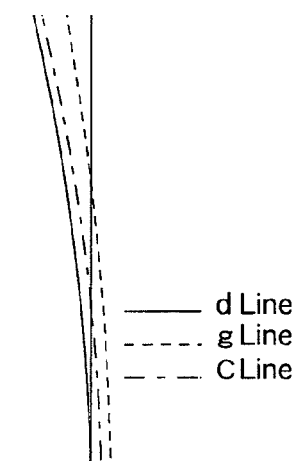
Fig. 2A
FNO.=1:4.8
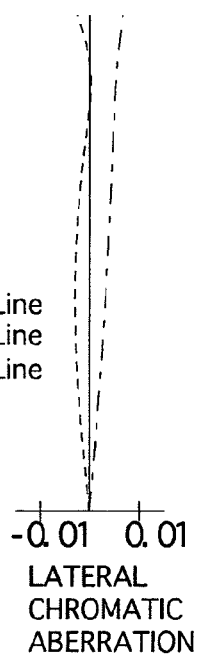
-0.05  0.05
SPHERICAL
ABERRATION
CHROMATIC
ABERRATION
Fig. 2B
W=89.0°
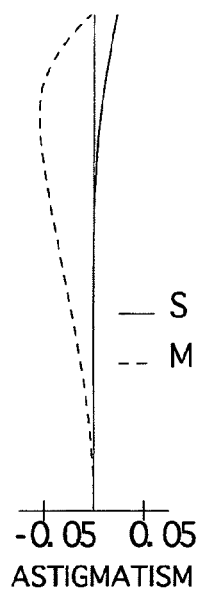
-0.01  0.01
LATERAL
CHROMATIC
ABERRATION
Fig. 2C
W=89.0°
-0.05  0.05
ASTIGMATISM
Fig. 2D
W=89.0°
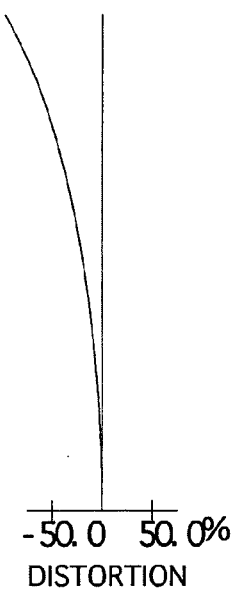
-50.0  50.0%
DISTORTION FIG.3
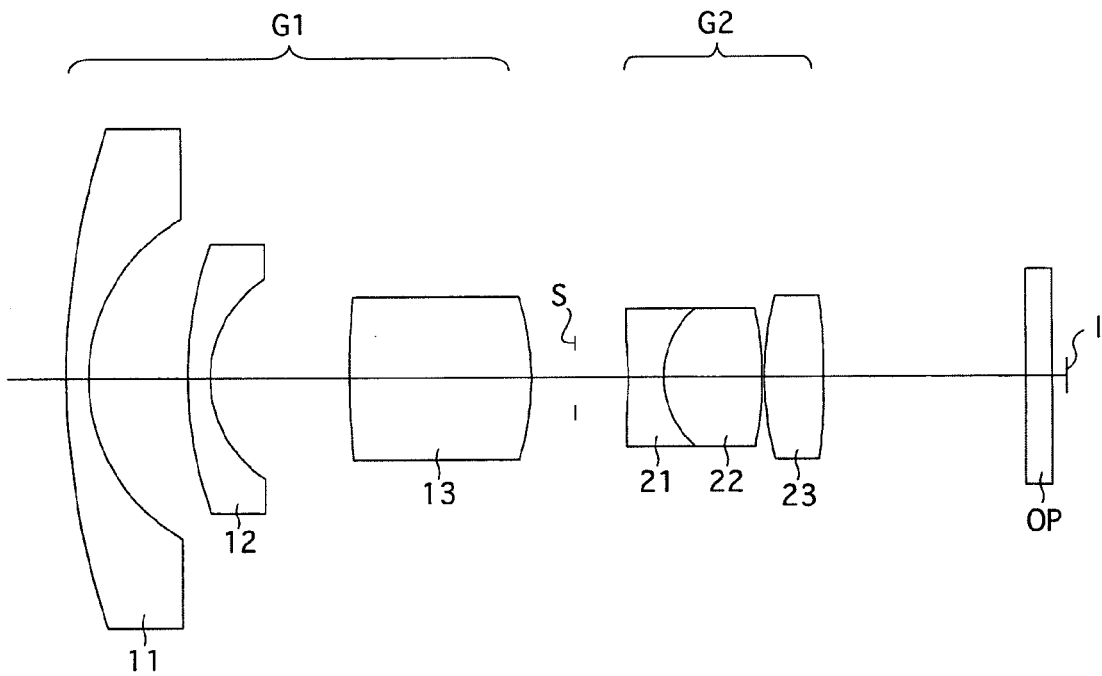
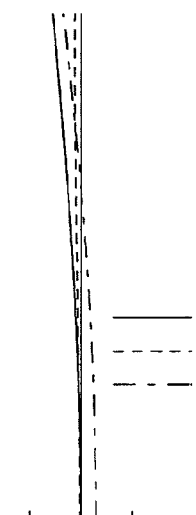
Fig. 4A
FNO.=1:4.5
—— d Line
----- g Line
--- C Line
-0.05  0.05
SPHERICAL
ABERRATION
CHROMATIC
ABERRATION
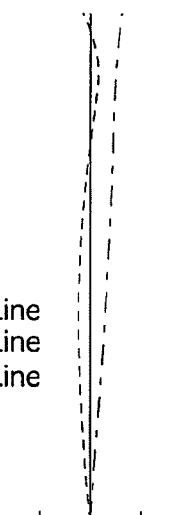
Fig. 4B
W=89.0°
-0.01  0.01
LATERAL
CHROMATIC
ABERRATION
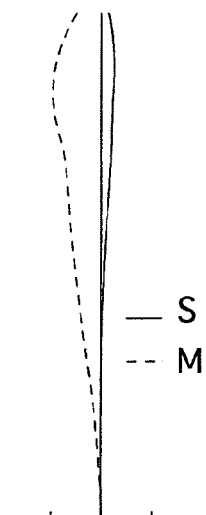
Fig. 4C
W=89.0°
—— S
-- M
-0.05  0.05
ASTIGMATISM
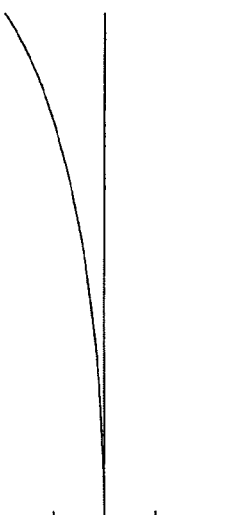
Fig. 4D
W=89.0°
-50.0  50.0%
DISTORTION Fig. 6A  FNO.=1:4.5
Fig. 6B  W=89.0°
Fig. 6C  W=89.0°
Fig. 6D  W=89.0°

— d Line
--- g Line
-·- C Line

— S
--- M

-0.05  0.05
SPHERICAL ABERRATION
CHROMATIC ABERRATION

-0.01  0.01
LATERAL CHROMATIC ABERRATION

-0.05  0.05
ASTIGMATISM

-50.0  50.0%
DISTORTION

SUPERWIDE-ANGLE LENS SYSTEM

BACKGROUND OF THE INVENTION

1. Field of the Invention

The present invention relates to a superwide-angle lens system that is suitable for use in a mirrorless exchangeable-lens camera in which a split-mirror (quick-return mirror) for an optical finder is omitted, a compact camera, a mobile phone camera, surveillance camera and an in-vehicle camera.

2. Description of Related Art

In a superwide-angle lens system for a single-lens reflex (SLR) camera, in order to avoid interference from an optical finder split-mirror that is positioned in between the lens system and the imaging plane, it is necessary to attain a long backfocus relative to the focal length (i.e., the conditions for the backfocus are strict).

Whereas, in a superwide-angle lens system for a mirrorless exchangeable-lens camera, since a split-mirror for an optical finder is omitted, there is no need to attain a long backfocus relative to the focal length (i.e., the conditions for the backfocus are more relaxed). In such a type of superwide-angle lens system, if the number of lens elements thereof is increased with the aim to attain a higher optical quality, the size of the entire lens system is enlarged and the overall cost thereof increases. Whereas, if the number of lens elements is reduced (down to, e.g., four lens elements) in order to further miniaturize and reduce the overall cost thereof, the optical quality of the lens system deteriorates. Furthermore, if a wide attachment is used, the lens system is enlarged and the imaging quality deteriorates, so that the optical quality deteriorates.

A superwide-angle lens system that does not require a long backfocus relative to the focal length (the conditions for the backfocus are relaxed) is known in the related art, and is configured of a negative first lens group and a positive second lens group, wherein the negative first lens group is configured of a negative lens element, a negative lens element and a positive lens element (i.e., three lens elements), in that order from the object side, and the second lens group is configured of a negative lens element, a positive lens element, and a positive lens element (i.e., three lens elements), in that order from the object side (Japanese Unexamined Patent Publication Nos. H04-68307, 2003-232998, and 2005-221920).

However, in the superwide-angle lens system taught in Japanese Unexamined Patent Publication No. H04-68307, the refractive power of each of the two negative lens elements provided in the negative first lens group is small, so that it is difficult to widen the angle-of-view. Furthermore, due to the balance between the positional shift (peak shift), between the optimum imaging plane with respect to a high-frequency object and the optimum imaging plane with respect to a low-frequency object caused by negative spherical aberration, and the field curvature, the above-mentioned superwide-angle lens system taught in Japanese Unexamined Patent Publication No. H04-68307 does not have a sufficient optical quality for an image sensor having a large number of pixels.

In the superwide-angle lens systems disclosed in Japanese Unexamined Patent Publication Nos. 2003-232998 and 2005-221920, since about two or three plastic lens elements are used, a high design performance is attained using aspherical surfaces (formed on the plastic lens elements), and the overall cost is reduced due to the utilization of inexpensive plastic lens elements. However, a large amount of focal shift occurs in plastic lens elements upon a change in temperature, thus causing problems with variations in optical quality and lacking sufficient durability.

SUMMARY OF THE INVENTION

The present invention has been devised in view of the above problems, and provides a superwide-angle lens system which is a type that does not require a long backfocus relative to the focal length (i.e., the conditions for the backfocus are relaxed), so that a high design performance is achieved while achieving miniaturization and a low cost, and a high quality during practical use can be maintained.

According to an aspect of the present invention, a superwide-angle lens system is provided, including a negative first lens group, an aperture diaphragm, and a positive second lens group, in that order from the object side. The first lens group is provided with a negative meniscus lens element having a convex surface on the object side, a negative meniscus lens element having a convex surface on the object side, and a positive lens element, in that order from the object side. The second lens group is provided with a cemented lens having a negative lens element and a positive lens element; and a positive lens element, in that order from the object side. The following conditions (1) and (2) are satisfied:

$$-1.45 < f12/f < -1.15 \qquad (1), \text{ and}$$

$$1.4 < SF2 < 2.4 \qquad (2),$$

wherein f12 designates the combined focal length of the two the negative meniscus lens elements provided in the first lens group, f designates the focal length of the entire superwide-angle lens system, SF2 designates the shaping factor of the negative meniscus lens element provided on the image side of the two the negative meniscus lens elements provided in the first lens group, $SF2=(r21+r22)/(r21-r22)$, r21 designates the radius of curvature of the surface on the object side of the negative meniscus lens element provided on the image side, and r22 designates the radius of curvature of the surface on the image side of the negative meniscus lens element provided on the image side.

It is desirable for the following condition (3) to be satisfied:

$$1.75 < nd1 \qquad (3),$$

wherein nd1 designates the refractive index at the d-line of the negative meniscus lens element provided on the object side of the two the negative meniscus lens elements.

It is desirable for the following condition (4) to be satisfied:

$$-0.5 < SF6 < 0.1 \qquad (4),$$

wherein SF6 designates the shaping factor of the positive lens element provided on the image side of the second lens group, $SF6=(r61+r62)/(r61-r62)$, r61 designates the radius of curvature of the surface on the object side of the positive lens element provided on the image side of the second lens group, and r62 designates the radius of curvature of the surface on the image side of the positive lens element provided on the image side of the second lens group.

It is desirable for the following condition (5) to be satisfied:

$$0.9 < fG1/fG2 < 1.8 \qquad (5),$$

wherein fG1 designates the focal length of the first lens group, and fG2 designates the focal length of the second lens group.

It is desirable for the superwide-angle lens system to include a fisheye lens system.

According to the present invention, a superwide-angle lens system is achieved, which is a type that does not require a long backfocus relative to the focal length (i.e., the conditions for the backfocus are relaxed), so that a high design performance is achieved while achieving miniaturization and a low cost, and a high quality during practical use can be maintained.

The present disclosure relates to subject matter contained in Japanese Patent Application No. 2011-176111 (filed on Aug. 11, 2011) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a superwide-angle lens system, according to the present invention, when focused on an object at infinity;

FIGS. 2A, 2B, 2C and 2D show various aberrations that occurred in the lens arrangement shown in FIG. 1;

FIG. 3 shows a lens arrangement of a second numerical embodiment of a superwide-angle lens system, according to the present invention, when focused on an object at infinity;

FIGS. 4A, 4B, 4C and 4D show various aberrations that occurred in the lens arrangement shown in FIG. 3;

FIGS. 6A, 6B, 6C and 6D show various aberrations that occurred in the lens arrangement shown in FIG. 5.

DESCRIPTION OF THE EMBODIMENTS

Figure 5:
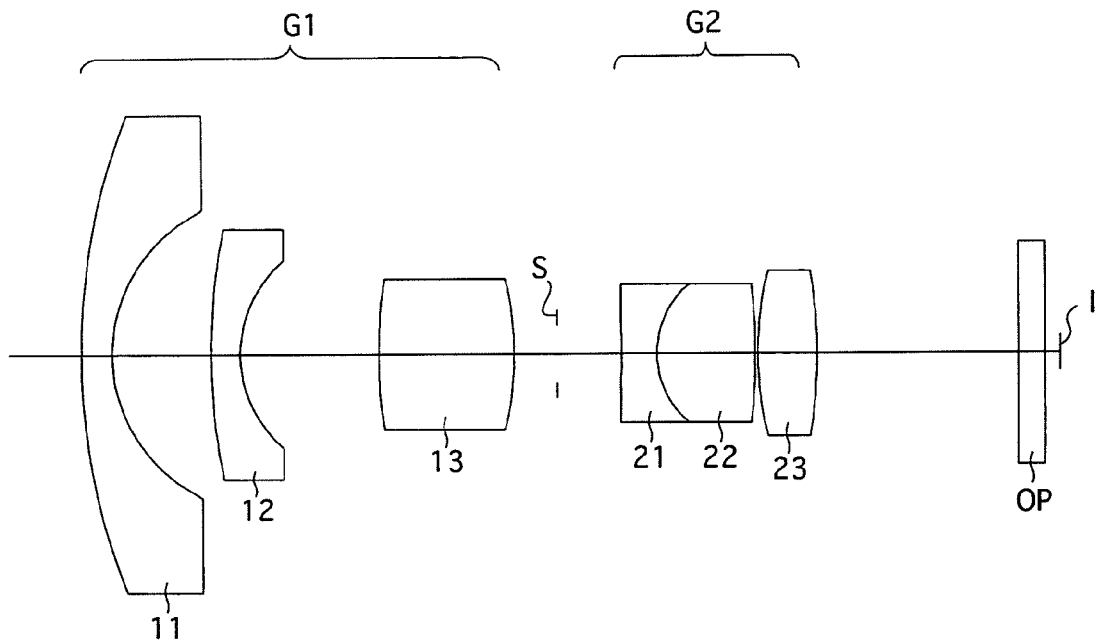
FIG. 5 shows a lens arrangement of a third numerical embodiment of a superwide-angle lens system, according to the present invention, when focused on an object at infinity.
Figure 5:
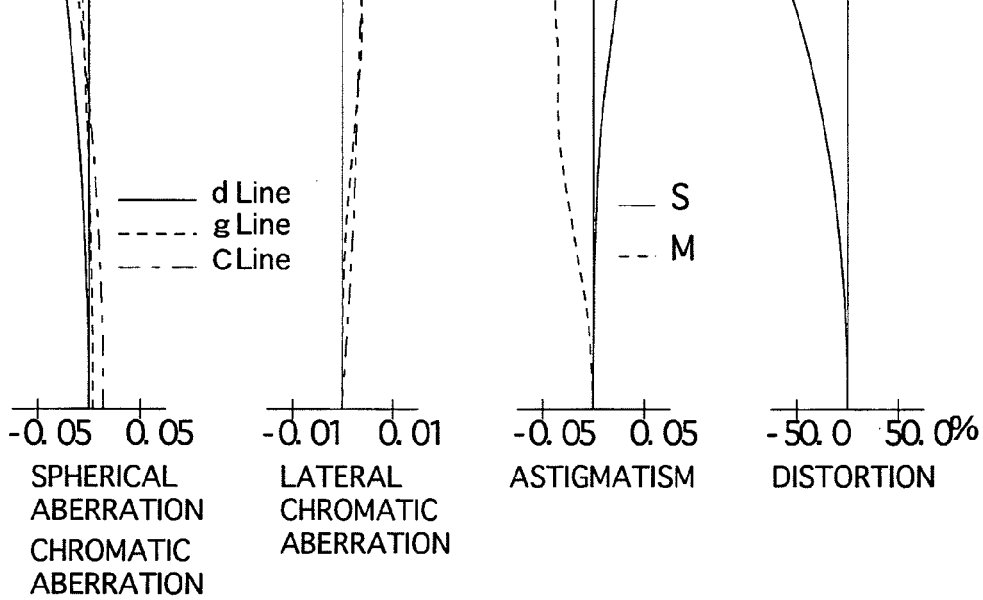

The superwide-angle lens system of the present invention is configured of a negative first lens group G1, an aperture diaphragm S, a positive second lens group G2 and an optical filter OP, in that order from the object side, as shown in FIGS. 1, 3 and 5 of the first, second and third numerical embodiments, respectively. "I" designates the imaging plane.

The first lens group G1 is configured of a negative meniscus lens element 11 having a convex surface on the object side, a negative meniscus lens element 12 having a convex surface on the object side, and a biconvex positive lens element 13, in that order from the object side.

The second lens group G2 is configured of a cemented lens having a biconcave negative lens element 21 and a biconvex positive lens element 22; and a biconvex positive lens element 23, in that order from the object side.

In the superwide-angle lens system illustrated in the embodiments, by configuring the first lens group G1 of the negative meniscus lens element 11 having a convex surface on the object side, the negative meniscus lens element 12 having a convex surface on the object side, and the biconvex positive lens element 13, in that order from the object side, various aberrations that occur at the two negative meniscus lens elements 11 and 12 that are provided on the object side can be favorably corrected at the biconvex positive lens element 13 that is provided on the image side (within the first lens group G1). Furthermore, by configuring the second lens group G2 of the cemented lens to have the biconcave negative lens element 21 and the biconvex positive lens element 22; and a biconvex positive lens element 23, in that order from the object side, chromatic aberrations can be favorably corrected while maintaining favorable telecentricity, so as to attain a superior optical quality.

In the superwide-angle lens system illustrated in the embodiments, by appropriately setting the combined focal length of the two negative meniscus lens elements 11 and 12 within the first lens group G1, and by appropriately setting the profile (shaping factor) of the negative meniscus lens element 12, a further miniaturized, lower cost, and higher quality superwide-angle lens system can be achieved. Furthermore, by appropriately setting the respective profiles (shaping factors) of the negative meniscus lens element 11 (of the first lens group G1) that is provided closest to the object side, and the biconvex positive lens element 23 (of the second lens group G2) that is provided closest to the image side, spherical aberration and coma can be favorably corrected and a superior optical quality can be attained even if aspherical surface lens elements are not used. Since aspherical surface lens elements are unnecessary, no deterioration in optical performance, due to environmental temperature changes in resin aspherical surface lens elements, occurs. Furthermore, there is no increase in cost that would otherwise be needed for glass-molded aspherical surface lens elements.

Condition (1) specifies the ratio of the combined focal length of the two negative meniscus lens elements 11 and 12 provided within the first lens group G1 to the focal length of the entire superwide-angle lens system. By satisfying condition (1), a 160 degree angle-of-view can be attained, and coma and field curvature can be favorably corrected so that a superior optical quality is achieved.

If the upper limit of condition (1) is exceeded, since the combined negative refractive power of the two negative meniscus lens elements 11 and 12 provided within the first lens group G1 becomes too strong, it becomes difficult to correct coma caused by the diverging component.

If the lower limit of condition (1) is exceeded, the combined negative refractive power of the two negative meniscus lens elements 11 and 12 provided within the first lens group G1 becomes too weak, the diverging component weakens, and the field curvature becomes negative, so that correction thereof becomes difficult. Furthermore, an angle-of-view of 160 degrees cannot be attained, which results in an insufficient angle-of-view for a superwide-angle lens system.

Condition (2) specifies the profile (shaping factor) of the negative meniscus lens element 12 on the image side (with respect to the negative meniscus lens element 11) within the first lens group G1. By satisfying condition (2), coma can be favorably corrected so that a superior optical quality can be attained.

If the upper limit of condition (2) is exceeded, the negative refractive power is concentrated on the negative meniscus lens element 12 so that the diverging component thereof becomes too strong, so that correction of coma becomes difficult.

If the lower limit of condition (2) is exceeded, the diverging component of the negative meniscus lens element 12 on the image side becomes weak, the negative refractive power is concentrated on the negative meniscus lens element 11 (provided on the object side within the first lens group G1) so that the diverging component thereof becomes too strong, so that correction of coma becomes difficult.

Condition (3) specifies the refractive index at the d-line of the negative meniscus lens element 11 that is provided on the object side within the first lens group G1. By satisfying condition (3), occurrence of coma can be suppressed and a superior optical quality can be attained.

If the lower limit of condition (3) is exceeded, the radius of curvature of the surface on the image side of the negative meniscus lens element 11 becomes too small, so that occurrence of coma increases.

Condition (4) specifies the profile (shaping factor) of the positive lens element 23 provided on the image side of the second lens group G2. By satisfying condition (4), spherical aberration, astigmatism and field curvature can be favorably corrected so that a superior optical quality is attained.

If the upper limit of condition (4) is exceeded, correction of the spherical aberration becomes insufficient and positive field curvature occurs, so that correction thereof becomes difficult.

If the lower limit of condition (4) is exceeded, correction of the spherical aberration becomes excessive and negative field curvature occurs, so that correction thereof becomes difficult.

Condition (5) specifies the ratio of the focal length of the first lens group G1 to the focal length of the second lens group G2. By satisfying condition (5), occurrence of coma and field curvature can be suppressed, thereby attaining a superior optical quality.

If the upper limit of condition (5) is exceeded, the refractive power of the first lens group G1 becomes too weak, the Petzval sum remains (does not become zero), so that it becomes difficult to correct sagittal field curvature in particular.

If the lower limit of condition (5) is exceeded, the refractive power of the first lens group G1 becomes too strong, so that correction of coma becomes difficult. Furthermore, it is difficult to produce the negative meniscus lens element 11.

[Embodiments]

Specific first through third numerical embodiments will be herein discussed. In the aberration diagrams and the tables, the d-line, g-line and the C-line show aberrations at their respective wave-lengths; S designates the sagittal image, M designates the meridional image, Fno. designates the f-number, f designates the focal length of the entire optical system, W designates the half angle of view (°), fB designates the backfocus (the air-equivalent distance (reduced distance) from the surface on the image side of the positive lens element 23 provided on the image side of the second lens group G2 to the imaging plane I), L designates the overall length of the lens system, R designates the radius of curvature, d designates the lens thickness or distance between lenses, N(d) designates the refractive index at the d-line, and vd designates the Abbe number with respect to the d-line. The unit used for the various lengths is defined in millimeters (mm). None of the first through third numerical embodiments use an aspherical surface lens element.

[Numerical Embodiment 1]

FIGS. 1 through 2D and Tables 1 and 2 show a first numerical embodiment of the superwide-angle lens system, according to the present invention. FIG. 1 shows a lens arrangement of the first numerical embodiment of the superwide-angle lens system when focused on an object at infinity. FIGS. 2A, 2B, 2C and 2D show various aberrations that occurred in the lens arrangement shown in FIG. 1. Table 1 shows the lens surface data. Table 2 shows various lens system data.

The superwide-angle lens system of the first numerical embodiment is configured of a negative first lens group G1, an aperture diaphragm S, a positive second lens group G2, and an optical filter OP, in that order from the object side. "I" designates the imaging plane.

The first lens group G1 is configured of a negative meniscus lens element 11 having a convex surface on the object side, a negative meniscus lens element 12 having a convex surface on the object side, and a biconvex positive lens element 13, in that order from the object side.

The second lens group G2 is configured of a cemented lens having a biconcave negative lens element 21 and a biconvex positive lens element 22; and a biconvex positive lens element 23, in that order from the object side.

TABLE 1

SURFACE DATA

| Surf. No. | r | d | Nd | vd |
|---|---|---|---|---|
| 1 | 25.641 | 0.900 | 1.77250 | 49.6 |
| 2 | 6.554 | 3.930 | | |
| 3 | 13.068 | 0.900 | 1.72916 | 54.7 |
| 4 | 4.504 | 5.510 | | |
| 5 | 32.024 | 7.000 | 1.78472 | 25.7 |
| 6 | −10.042 | 1.750 | | |
| 7(Diaphragm) | ∞ | 1.479 | | |
| 8 | −22.394 | 1.350 | 1.80518 | 25.5 |
| 9 | 3.782 | 4.000 | 1.74330 | 49.2 |
| 10 | −22.138 | 0.100 | | |
| 11 | 15.298 | 2.500 | 1.69680 | 55.5 |
| 12 | −15.298 | 8.000 | | |
| 13 | ∞ | 1.050 | 1.51680 | 64.2 |
| 14 | ∞ | — | | |

TABLE 2

LENS SYSTEM DATA

| FNO. | 4.8 |
|---|---|
| f | 3.24 |
| W | 89.0 |
| fB | 9.19 |
| L | 47.66 |

[Numerical Embodiment 2]

FIGS. 3 through 4D and Tables 3 and 4 show a second numerical embodiment of the superwide-angle lens system, according to the present invention. FIG. 3 shows a lens arrangement of the second numerical embodiment of the superwide-angle lens system when focused on an object at infinity. FIGS. 4A, 4B, 4C and 4D show various aberrations that occurred in the lens arrangement shown in FIG. 3. Table 3 shows the lens surface data. Table 4 shows various lens system data.

The lens arrangement of the second numerical embodiment is the same as that of the first numerical embodiment.

TABLE 3

SURFACE DATA

| Surf. No. | r | d | Nd | vd |
|---|---|---|---|---|
| 1 | 30.501 | 0.880 | 1.80420 | 46.5 |
| 2 | 7.300 | 3.930 | | |
| 3 | 16.000 | 0.880 | 1.69680 | 55.5 |
| 4 | 4.744 | 5.510 | | |
| 5 | 36.168 | 7.250 | 1.80518 | 25.5 |
| 6 | −11.006 | 1.750 | | |
| 7(Diaphragm) | ∞ | 2.143 | | |
| 8 | −16.684 | 1.420 | 1.78472 | 25.7 |
| 9 | 3.592 | 3.900 | 1.74400 | 44.9 |
| 10 | −14.059 | 0.100 | | |
| 11 | 12.803 | 2.350 | 1.69680 | 55.5 |
| 12 | −29.000 | 8.000 | | |
| 13 | ∞ | 1.050 | 1.51680 | 64.2 |
| 14 | ∞ | — | | |

TABLE 4

LENS SYSTEM DATA

| FNO. | 4.5 |
|---|---|
| f | 3.22 |
| W | 89.0 |
| fB | 9.19 |

TABLE 4-continued

LENS SYSTEM DATA

| | |
|---|---|
| L | 48.35 |

[Numerical Embodiment 3]

FIGS. 5 through 6D and Tables 5 and 6 show a third numerical embodiment of the superwide-angle lens system, according to the present invention. FIG. 5 shows a lens arrangement of the third numerical embodiment of the superwide-angle lens system when focused on an object at infinity. FIGS. 6A, 6B, 6C and 6D show various aberrations that occurred in the lens arrangement shown in FIG. 5. Table 5 shows the lens surface data. Table 6 shows various lens system data.

The lens arrangement of the third numerical embodiment is the same as that of the first numerical embodiment.

TABLE 5

SURFACE DATA

| Surf. No. | r | d | Nd | νd |
|---|---|---|---|---|
| 1 | 26.092 | 1.200 | 1.83481 | 42.7 |
| 2 | 6.372 | 3.930 | | |
| 3 | 25.473 | 1.150 | 1.72916 | 54.7 |
| 4 | 4.950 | 5.510 | | |
| 5 | 19.094 | 5.406 | 1.78472 | 25.7 |
| 6 | −12.916 | 1.750 | | |
| 7(Diaphragm) | ∞ | 2.569 | | |
| 8 | −54.236 | 1.420 | 1.80518 | 25.5 |
| 9 | 3.598 | 3.900 | 1.74330 | 49.2 |
| 10 | −26.147 | 0.100 | | |
| 11 | 13.434 | 2.350 | 1.69680 | 55.5 |
| 12 | −19.457 | 8.000 | | |
| 13 | ∞ | 1.050 | 1.51680 | 64.2 |
| 14 | ∞ | — | | |

TABLE 6

LENS SYSTEM DATA

| | |
|---|---|
| FNO. | 4.5 |
| f | 3.22 |
| W | 89.0 |
| fB | 9.19 |
| L | 47.53 |

The numerical values of each condition for each embodiment are shown in Table 7.

TABLE 7

| | Embod. 1 | Embod. 2 | Embod. 3 |
|---|---|---|---|
| Cond. (1) | −1.36 | −1.41 | −1.18 |
| Cond. (2) | 2.05 | 1.84 | 1.48 |
| Cond. (3) | 1.77250 | 1.80420 | 1.83481 |
| Cond. (4) | 0.00 | −0.39 | −0.18 |
| Cond. (5) | 1.00 | 1.32 | 1.69 |

As can be understood from Table 7, the first through third numerical embodiments satisfy conditions (1) through (5). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A superwide-angle lens system comprising a negative first lens group, an aperture diaphragm, and a positive second lens group, in that order from the object side,
    wherein said first lens group is provided with a negative meniscus lens element having a convex surface on the object side, a negative meniscus lens element having a convex surface on the object side, and a positive lens element, in that order from the object side,
    wherein said second lens group is provided with a cemented lens having a negative lens element and a positive lens element; and a positive lens element, in that order from the object side, and
    wherein the following conditions (1) and (2) are satisfied:

$$-1.45 < f12/f < -1.15 \quad (1), \text{ and}$$

$$1.4 < SF2 < 2.4 \quad (2), \text{ wherein}$$

f12 designates the combined focal length of the two said negative meniscus lens elements provided in said first lens group,
    f designates the focal length of the entire said superwide-angle lens system,
    SF2 designates the shaping factor of the negative meniscus lens element provided on the image side of the two said negative meniscus lens elements provided in said first lens group, $$SF2 = (r21 + r22)/(r21 - r22),$$

r21 designates the radius of curvature of the surface on the object side of said negative meniscus lens element provided on the image side, and
    r22 designates the radius of curvature of the surface on the image side of said negative meniscus lens element provided on the image side.

2. The superwide-angle lens system according to claim 1, wherein the following condition (3) is satisfied:

$$1.75 < nd1 \quad (3), \text{ wherein}$$

nd1 designates the refractive index at the d-line of the negative meniscus lens element provided on the object side of the two said negative meniscus lens elements.

3. The superwide-angle lens system according to claim 1, wherein the following condition (4) is satisfied:

$$-0.5 < SF6 < 0.1 \quad (4), \text{ wherein}$$

SF6 designates the shaping factor of the positive lens element provided on the image side of said second lens group, $$SF6 = (r61 + r62)/(r61 - r62),$$

r61 designates the radius of curvature of the surface on the object side of said positive lens element provided on the image side of said second lens group, and
    r62 designates the radius of curvature of the surface on the image side of said positive lens element provided on the image side of said second lens group.

4. The superwide-angle lens system according to claim 1, wherein the following condition (5) is satisfied:

$$0.9 < fG1/fG2 < 1.8 \quad (5), \text{ wherein}$$

fG1 designates the focal length of said first lens group, and
    fG2 designates the focal length of said second lens group.

5. The superwide-angle lens system according to claim 1, wherein said superwide-angle lens system comprises a fisheye lens system.

* * * * *